US011492980B2

(12) United States Patent
Ma et al.

(10) Patent No.: US 11,492,980 B2
(45) Date of Patent: Nov. 8, 2022

(54) BUMPLESS TRANSFER FAULT TOLERANT CONTROL METHOD FOR AERO-ENGINE UNDER ACTUATOR FAULT

(71) Applicant: DALIAN UNIVERSITY OF TECHNOLOGY, Liaoning (CN)

(72) Inventors: Yanhua Ma, Liaoning (CN); Xian Du, Liaoning (CN); Rui Wang, Liaoning (CN); Tongjian Liu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 330 days.

(21) Appl. No.: 16/761,031

(22) PCT Filed: Jun. 13, 2019

(86) PCT No.: PCT/CN2019/091061
§ 371 (c)(1),
(2) Date: May 1, 2020

(87) PCT Pub. No.: WO2020/248184
PCT Pub. Date: Dec. 17, 2020

(65) Prior Publication Data
US 2021/0189973 A1 Jun. 24, 2021

(51) Int. Cl.
F02C 9/00 (2006.01)
G05B 23/02 (2006.01)
B64D 31/00 (2006.01)

(52) U.S. Cl.
CPC .............. F02C 9/00 (2013.01); B64D 31/00 (2013.01); G05B 23/0218 (2013.01);
(Continued)

(58) Field of Classification Search
CPC ....... F02C 9/00; B64D 31/00; G05B 23/0218; G05B 23/0286; F05D 2220/323; F05D 2270/46; F05D 2260/81
See application file for complete search history.

(56) References Cited

U.S. PATENT DOCUMENTS

2007/0198225 A1* 8/2007 Roach ................... B64C 13/505
702/182
2013/0304235 A1 11/2013 Kun

FOREIGN PATENT DOCUMENTS

CN 105204495 A * 12/2015 ......... G05B 23/0218
CN 108710293 A * 10/2018 ........... G05B 13/042
(Continued)

OTHER PUBLICATIONS

"Linfeng Gou et al., Fault Diagnosis for Actuator of Aero-Engine Based on Associated Observers, 2018, IEEE, https://ieeexplore.ieee.org/document/8483726" (Year: 2018).*

Primary Examiner — Santosh R Poudel
(74) Attorney, Agent, or Firm — Muncy, Geissler, Olds & Lowe, P.C.

(57) ABSTRACT

A bumpless transfer fault tolerant control method for aero-engine under actuator fault is disclosed. For an aero-engine actuator fault, by adopting an undesired oscillation problem produced by an active fault tolerant control method based on a virtual actuator, in order to solve the shortage of the existing control method, a bumpless transfer active fault tolerant control design method for the aero-engine actuator fault is provided, which can guarantee that a control system of the reconfigured aero-engine not only has the same state and output as an original fault-free system without changing the structure and parameters of a controller, to achieve a desired control objective, and that a reconfigured system has a smooth transient state, that is, output parameters such as rotational speed, temperature and pressure do not produce the undesired transient characteristics such as overshoot or oscillation.

1 Claim, 6 Drawing Sheets

(52) U.S. Cl.
CPC .... G05B 23/0286 (2013.01); *F05D 2220/323* (2013.01); *F05D 2270/46* (2013.01)

(56) References Cited

FOREIGN PATENT DOCUMENTS

| | | | | |
|---|---|---|---|---|
| CN | 109557818 A | | 4/2019 | |
| CN | 109630281 A | * | 4/2019 | ............... F02C 9/00 |
| CN | 109630281 A | | 4/2019 | |
| CN | 109799803 A | | 5/2019 | |

* cited by examiner

BUMPLESS TRANSFER FAULT TOLERANT CONTROL METHOD FOR AERO-ENGINE UNDER ACTUATOR FAULT

TECHNICAL FIELD

The present invention relates to a bumpless transfer active fault tolerant control design method for an aero-engine under actuator fault, which belongs to the technical field of aircraft control, and specifically, is an active fault tolerant control method for ensuring the smoothness around a switching point when the aero-engine actuator fault occurs in order to improve transient characteristics of a system when the controller reconfiguration is performed.

BACKGROUND

In the field of aero-engine control, it is always difficult to solve the problem of how a reconfigured controller is switched into a fault system without negative responses such as bump after an aero-engine actuator fault occurs. In view of the bumpless transfer design of a controller in a reconfiguration process, on one hand, the fault tolerant control should be effectively realized; on the other hand, a bump problem brought when a reconfigured controller is switched into the fault system should also be reduced, which can effectively reduce the potential safety hazard brought by the oscillation of the rotational speed of the low pressure and high pressure rotors of an aero-engine. Therefore, the present invention is of great significance for the switching of the reconfigured controller when the aero-engine actuator fault occurs.

It is shown in the literature that when an existing virtual actuator technology are used for the reconfiguration control of an actuator for the fault of the actuator, the switching process of the designed virtual actuator will lead to the occurrence of undesired oscillations. This kind of phenomenon is caused by a traditional virtual actuator fault tolerant technology, without the consideration that how the reconfigured virtual actuator is switched into the system when the virtual actuator is switched into a control system. Although the purpose of the reconfiguration control technology of the traditional virtual actuator is to ensure that the compensated controller can hide the fault when the actuator fault occurs in a control process, thereby ensuring that the original control effect can be restored to the system, if it is not considered that how the compensation is switched into the fault system, an adjoint oscillation phenomenon in the aero-engine control will cause a very serious safety hazard, and in serious cases will even cause a system state to diverse. The literature shows that there is no solution to this problem at present. In addition, a design structure of the traditional virtual actuator is not suitable for the optimal control of the performance when the actuator reconfiguration is implemented, because the optimal performance parameters to be solved are matrices, which will generate a large amount of computation.

The present invention improves a traditional design method of the technology, and on this basis, in combination with the optimal control, realizes the bumpless transfer of the reconfigured virtual actuator while analytically repairing a fault. The method can effectively reduce the impact brought by the bump in the fault tolerant process of the actuator, thereby reducing the safety hazard.

SUMMARY

The technical solution of the present invention is: according to an aero-engine actuator fault, an undesired oscillation problem produced by an active fault tolerant control method based on a virtual actuator, in order to solve the shortage of the existing control method, a bumpless transfer active fault tolerant control design method for the aero-engine actuator fault is provided, which can guarantee that a control system of the reconfigured aero-engine not only has the same state and output as an original fault-free system without changing the structure and parameters of a controller, to achieve a desired control objective, and that a reconfigured system has a smooth transient state, that is, output parameters such as rotational speed, temperature and pressure do not produce the undesired transient characteristics such as overshoot or oscillation. The proposed method is simple to calculate, which is of engineering significance to aero-engine performance improvement.

The technical solution of the present invention is that:

a bumpless transfer fault tolerant control method for an aero-engine actuator fault comprises the following steps:

step 1: expressing an aero-engine system as:

$$\begin{cases} \dot{x}(t) = Ax(t) + Bu(t) \\ y(t) = Cx(t) \end{cases} \quad (1)$$

where, $x(t) \in R^n$ is a state of a system, A is n-dimensional square matrix, B is n×m matrix, C is n-dimensional square matrix, $u(t) \in R^m$ is a system input and the input is designed as a form of output-state feedback: m is control input dimension, and n is state dimension;

$$u(t) = Ky(t) \quad (2)$$

where, K is gain matrix of an aero-engine controller;

when the actuator fault occurs, an aero-engine system is expressed as $$\begin{cases} \dot{x}_f(t) = Ax_f(t) + B_f u_f(t) \\ y_f(t) = Cx_f(t) \end{cases} \quad (3)$$

where, an actuator fault matrix $B_f$ is known, and $B_f^T * B_f$ is an invertible matrix; and f is used for characterizing a subscript of a fault system;

step 2: designing an improved virtual actuator, with a structural form shown in (4):

$$\begin{cases} \dot{\tilde{x}}(t) = A\tilde{x}(t) + Bu(t) - B_f u_f(t) \\ u_f(t) = u_w(t) + Nu_c(t) \\ y_c(t) = C\tilde{x}(t) + y_f(t) \end{cases} \quad (4)$$

where, $\tilde{x}(t) \in R^n$ is a virtual actuator state, $u_c(t) = -Ky_c(t)$, K is the same as that in an equation (2), $u_w(t)$ is a parameter to be designed, $N = B_f^\dagger B_f$, $B_f^\dagger$ is a Moore-Penrose inverse matrix of $B_f$; c is a subscript of a nominal controller, and w is a subscript of a variable to be solved;

step 3: in order to implement an aero-engine fault system in step 1 of a bumpless transfer of an improved virtual actuator in step 2, designing performance parameters shown in an equation (5), wherein when a performance function is optimized, the bumpless transfer of the virtual actuator in step 2 is implemented;

$$J = \tfrac{1}{2} \tilde{x}^T(t_f) C^T RC \tilde{x}(t_f) + \int_0^{t_f} \tfrac{1}{2}(Bu(t) - B_f u_f(t))^T P(Bu(t) - B_f u_f(t)) + \tfrac{1}{2} \dot{\tilde{x}}^T(t) Q \dot{\tilde{x}} dt \quad (5)$$

where, J is the performance function, P≥0, Q≥0, R>0, P+Q>0, and P, Q, R are symmetric weight matrices;

Step 4: according to a form of an actuator fault matrix Bf, considering the following two conditions:

$$\text{Condition 1: } B_f B_f^\dagger B = B \quad (6)$$

$$\text{Condition 2: } B_f B_f^\dagger B \neq B \quad (7)$$

when condition 1 occurs, the improved virtual actuator (4) in step 2 is simplified as a form of the following equation (8):

$$\begin{cases} \dot{\tilde{x}}(t) = A\tilde{x}(t) - B_f u_w(t) \\ \tilde{x}(t_0) = a \end{cases} \quad (8)$$

where, a is an initial state that constant vectors characterize, which is obtained through difference between a state in aero-engine system (1) in step 1 and a state in a system (3) at the time when $B_f$ is diagnosed after the fault;

when condition 2 occurs, the virtual actuator (4) in step 2 is written as a form of the following equation (9):

$$\begin{cases} \dot{\tilde{x}}(t) = A\tilde{x}(t) - (I - B_f B_f^\dagger) BKC\tilde{x}(t) - (I - B_f B_f^\dagger) BKy_f(t) - B_f u_w(t) \\ \tilde{x}(t_0) = a \end{cases} \quad (9)$$

where, a is an initial state that constant vectors characterize, which is obtained through difference between the state in aero-engine system (1) in step 1 and the state in a system (3) at the time when the fault $B_f$ is diagnosed, and I is n-dimensional square matrix;

step 5: in consideration of the condition 1 in step 4, designing a parameter $u_W(t)$ according to an equation (10), that is, satisfying a performance index function in step 3 and implementing an aero-engine fault system (3) in step 1 of the bumpless transfer of the improved virtual actuator (4) in step 2:

$$u_w(t) = (B_f^T (P+Q) B_f)^{-1} B_f^T (QA + F(t)) \tilde{x}(t) \quad (10)$$

where, the matrix F(t) is a symmetric positive definite matrix, and satisfies the equation (11) in the time interval t∈[0, tf]:

$$-\dot{F}(t) = F(t)A + (A^T - (A^T Q + F(t)) B_f (B_f^T (P+Q) B_f)^\dagger B_f^T (QA + F(t))) \quad (11)$$

F(t) satisfies the following boundary condition (12):

$$C^T F(tf) C = R \quad (12)$$

where, R is a weight matrix in step 3(5);

step 6: in consideration of the condition 2 in step 4, defining $\hat{x}(t) := \tilde{x}(t) + x_f(t)$, and expressing the reconfigured aero-engine control system as:

$$\begin{cases} \dot{\hat{x}}(t) = A\hat{x}(t) + Bu(t) \\ \hat{y}(t) = C\hat{x}(t) \end{cases} \quad (13)$$

wherein, the initial state is $\hat{x}(0) = x_f(0) + \tilde{x}(0)$; and the reconfigured aero-engine control system state (14) influenced only by a design parameter K of an original aero-engine system controller is obtained by substituting an output-state feedback controller $u(t) = -K\hat{y}(t) = -KC\hat{x}(t)$ into an equation (13), where K is consistent with the designed K in the equation (2) of step 1:

$$\dot{\hat{x}}(t) = (A - BKC) \hat{x}(t) \quad (14)$$

the equation (14) is substituted into a virtual actuator structure (9) in step 4, to obtain:

$$\begin{cases} \dot{\tilde{x}}(t) = A\tilde{x}(t) - B_f u_w(t) - (I - B_f B_f^\dagger) BKC\hat{x}(t) \\ \tilde{x}(t_0) = a \end{cases} \quad (15)$$

the design parameter $u_w(t)$ is shown in an equation (16), that is, the performance index function in step 3 is satisfied, and the aero-engine fault system (3) in step 1 of the bumpless transfer of the improved virtual actuator (4) in step 2 is implemented:

$$u_w(t) = (B_f^T (P+Q) B_f)^{-1} B_f^T (-(P+Q)(I - B_f B_f^\dagger) BKC\hat{x}(t) + (QA + E(t)) \tilde{x}(t) + G(t)) \quad (16)$$

where, $\hat{x}(t)$ satisfies the equation (14), and E(t) is the symmetric positive definite matrix of the equation (17) and satisfies a boundary condition of the equation (18);

$$-\dot{E}(t) = E(t)(I - B_f (B_f^T (P+Q) B_f)^{-1} B_f^T Q) A + \quad (17)$$
$$A^T (I - Q B_f (B_f^T (P+Q) B_f)^{-1} B_f^T) E(t) -$$
$$E(t) B_f (B_f^T (P+Q) B_f)^{-1} B_f^T E(t) +$$
$$A^T QA - A^T Q B_f (B_f^T (P+Q) B_f)^{-1} B_f^T QA$$

E(t) satisfies the boundary condition:

$$C^T E(tf) C = R \quad (18)$$

an adjoint vector G(t) satisfies the following equation:

$$\dot{G}(t) = ((A^T Q + E(t)) B_f (B_f^T (P+Q) B_f)^{-1} - A^T) G(t) + \quad (19)$$
$$(E(t) + A^T Q)(I - B_f (B_f^T (P+Q) B_f)^{-1} (P+Q))(I - B_f B_f^\dagger) KC\hat{x}(t)$$

the boundary condition of the adjoint equation (19) is $$G(tf) = 0 \quad (20)$$

The beneficial effects of the present invention are that: the reconfiguration fault tolerant control on the system after the aero-engine actuator fault occurs can be conducted through the aero-engine reconfigured controller designed by the method of the present invention, and the undesired bump brought by the switching can be effectively avoided when the reconfigured controller is switched.

DETAILED DESCRIPTION

Figure 1:
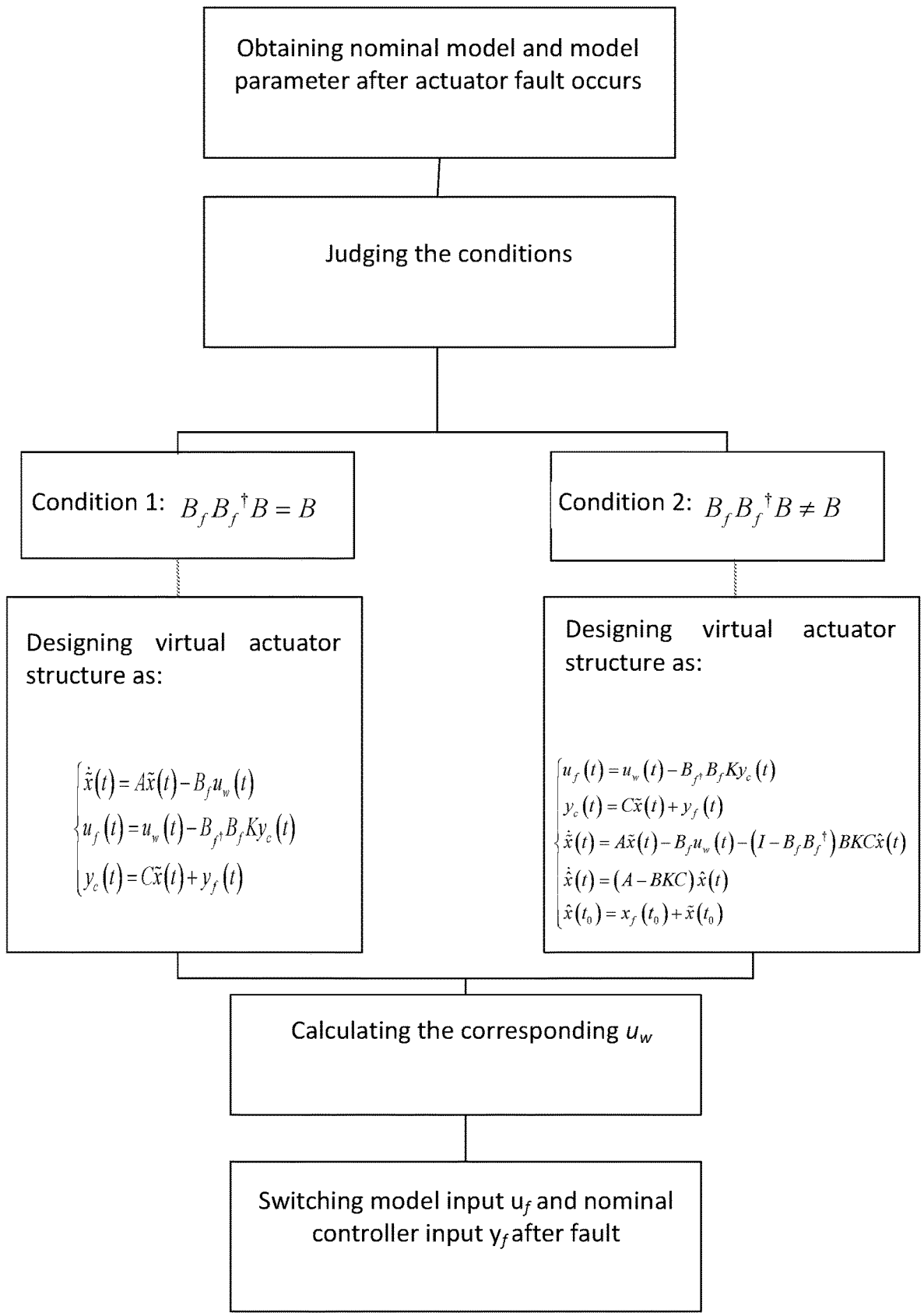
FIG. 1 is a flow chart of reconfiguration control design for a bumpless virtual actuator of an aero-engine under actuator fault.

The present invention will be further described below in combination with the drawings. The research object of the present invention is the reconfiguration and the switching process of a controller after an aero-engine actuator fault occurs, a design method thereof is shown in a flow chart of FIG. 1, and the detailed design steps are as follows:

step 1: obtaining an aero-engine system model A,B,C,$x(t_0)$, a gain matrix K of an aero-engine controller and a parameter $B_f$, $x_f(t_0)$ of the aero-engine system after fault;

step 2: according to an actuator parameter matrix B of the aero-engine system and the diagnosed actuator parameter matrix $B_f$ after fault, judging the conditions; if $B_f B_f^\dagger B = B$, performing a step 3; and if $B_f B_f^\dagger B \neq B$, performing a step 5;

step 3: designing a virtual actuator as:

$$\begin{cases} \dot{\tilde{x}}(t) = A\tilde{x}(t) - B_f u_w(t) \\ u_f(t) = u_w(t) - B_f^\dagger B_f K y_c(t) \\ y_c(t) = C\tilde{x}(t) + y_f(t) \end{cases} \quad (21)$$

where, $\tilde{x}(t_0) = x(t_0) - x_f(t_0)$, $u_w(t) = (B_f^T(P+Q)B_f)^{-1}B_f^T(QA+F(t))\tilde{x}(t)$; and a symmetric positive definite matrix $F(t)$ is obtained by solving a Riccati equation (22) in which the boundary conditions satisfy $C^T F(tf)C = R$.

$$-\dot{F}(t) = F(t)A + (A^T - (A^T Q + F(t))B_f(B_f^T(P+Q)B_f)^\dagger B_f^T(QA+F(t))) \quad (22)$$

Figure 2:
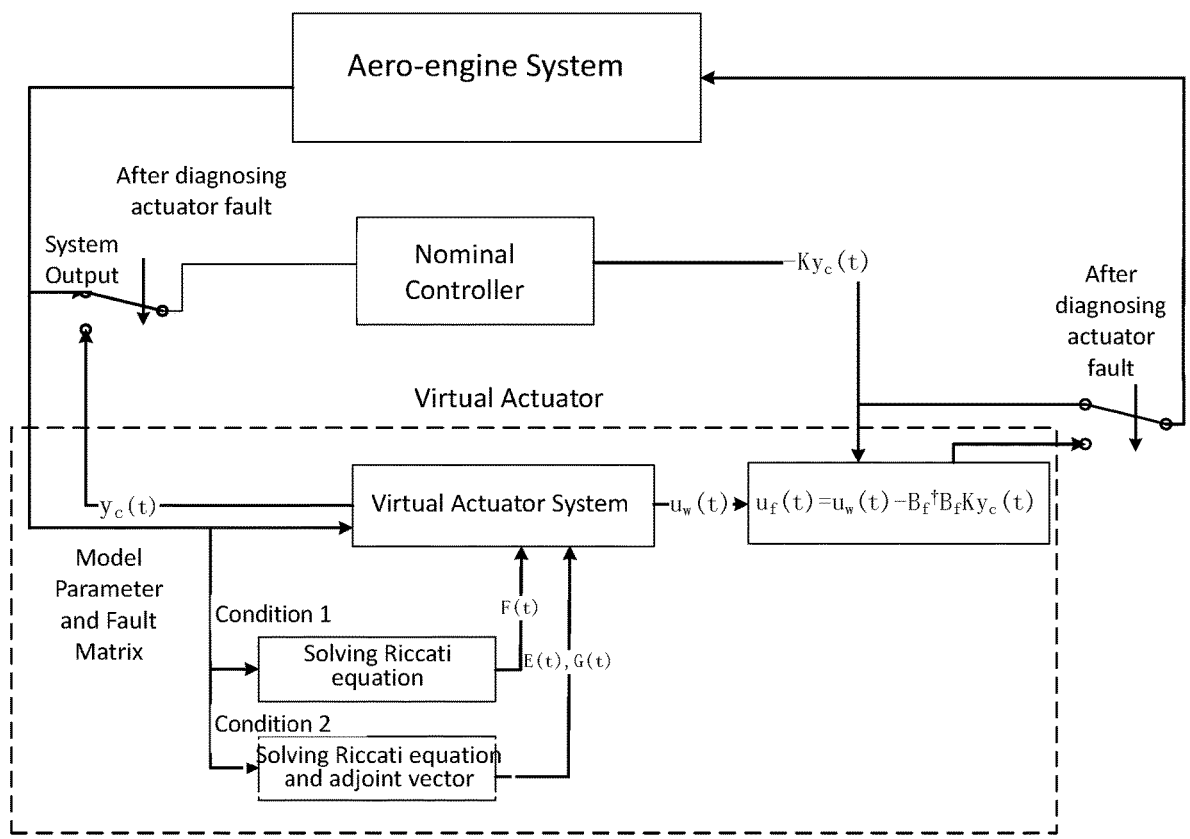
FIG. 2 is a virtual actuator switch framework of an aero-engine actuator fault system.

Using the switch logic in FIG. 2, the reconfigured $u_f$ is switched into a fault model, and the compensated controller input $y_c(t)$ is switched into an original aero-engine controller without changing the parameter of the original aero-engine controller K.

step 4: designing the virtual controller as:

$$\begin{cases} u_f(t) = u_w(t) - B_f^\dagger B_f K y_c(t) \quad (21) \\ y_c(t) = C\tilde{x}(t) + y_f(t) \\ \dot{\tilde{x}}(t) = A\tilde{x}(t) - B_f u_w(t) - (I - B_f B_f^\dagger)BKC\hat{x}(t) \\ \dot{\hat{x}}(t) = (A - BKC)\hat{x}(t) \\ \hat{x}(t_0) = x_f(t_0) + \tilde{x}(t_0) \end{cases}$$

where, $u_w(t)$ is:

$$u_w(t) = (B_f^T(P+Q)B_f)^{-1}B_f^T(-(P+Q)(I-B_f B_f^\dagger)BKC\hat{x}(t) + (QA+E(t))\tilde{x}(t) + G(t)) \quad (22)$$

The symmetric positive definite matrix $E(t)$ in an equation (22) is obtained by solving the equation (24) in which the boundary conditions satisfy the Riccati equation (23); and an adjoint vector $G(t)$ is obtained by solving the equation (25) in which the boundary conditions satisfy the equation (26).

$$-\dot{E}(t) = E(t)(I - B_f(B_f^T(P+Q)B_f)^{-1}B_f^T Q)A + \\ A^T(I - QB_f(B_f^T(P+Q)B_f)^{-1}B_f^T)E(t) - \\ E(t)B_f(B_f^T(P+Q)B_f)^{-1}B_f^T E(t) + \\ A^T QA - A^T QB_f(B_f^T(P+Q)B_f)^{-1}B_f^T QA \quad (23)$$

$$C^T E(tf)C = R \quad (24)$$

$$\dot{G}(t) = ((A^T Q + E(t))B_f(B_f^T(P+Q)B_f)^{-1} - A^T)G(t) + (E(t) + A^T Q) \\ (I - B_f(B_f^T(P+Q)B_f)^{-1}(P+Q))(I - B_f B_f^\dagger)KC\hat{x}(t) \quad (25)$$

$$G(tf) = 0 \quad (26)$$

Using the switch logic in FIG. 2, the reconfigured $u_f$ is switched into an aero-engine fault system, and the compensated controller input $y_c(t)$ is switched into the original aero-engine controller without changing the parameter of the original aero-engine controller K.

step 5: respectively verifying the design of bumpless transfer control under two conditions, wherein in a condition 1, a system model at a certain steady point of a test-run state of a three ducts variable cycle engine is adopted, and the model coefficient of the three ducts variable cycle engine is:

$$A = \begin{bmatrix} -6.5865 & 21.8290 \\ -0.6504 & 0.2127 \end{bmatrix}, B = \begin{bmatrix} 0.0754 & 0.2371 \\ 0.2629 & 0.1484 \end{bmatrix}, \quad (27)$$

$$C = \begin{bmatrix} 1 & 0 \\ 0 & 1 \end{bmatrix}, x(0) = [-20, 35]^T$$

The control input is $u = [\Delta W_{fb}(t), \Delta A_8(t)]^T$, where $\Delta W_{fb}$ is the variation of aero-engine fuel flow, and $\Delta A_8$ is the variation $[\Delta n_l(t), \Delta n_h(t)]^T$ of an aero-engine guide vane angle; and where $\Delta n_l$ is the variation of the rotational speed of an aero-engine low pressure rotor, and $\Delta n_h$ is the variation of the rotational speed of an aero-engine high pressure rotor.

Suppose the actuator fault occurs at $t=0.5$ s, $B_f$ is diagnosed at $t=3$ s.

$$B_f = \begin{bmatrix} 0.6198 & 0.4772 \\ 0.3233 & 0.1434 \end{bmatrix} \quad (28)$$

Figure 3:
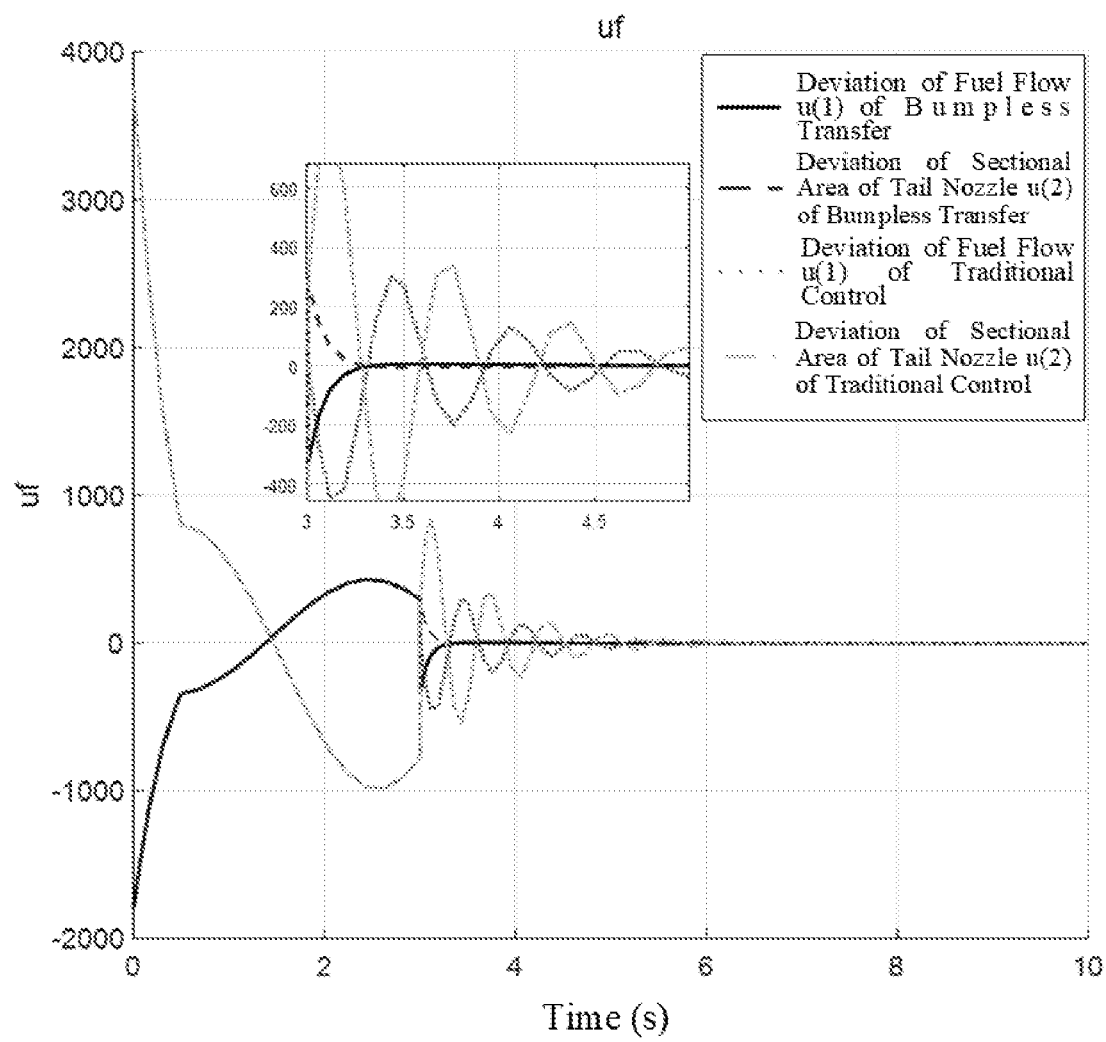
FIG. 3 is a contrast diagram of bumpless transfer of reconfiguration control input $[\Delta W_{fb}(t), \Delta A_8(t)]^T$ in a condition 1.
Figure 4:
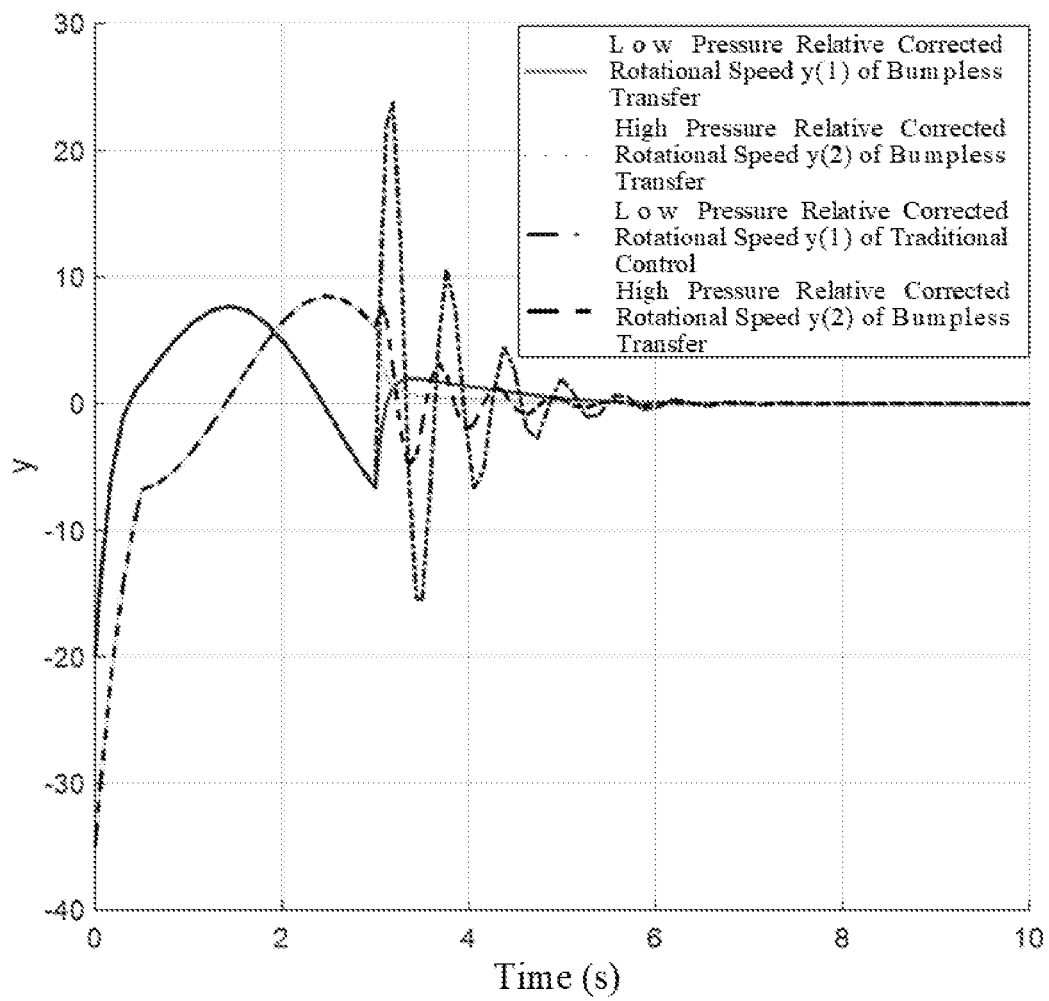
FIG. 4 is a contrast diagram of bumpless transfer of reconfiguration control output $[\Delta n_f(t), \Delta n_h(t)]^T$ in a condition 1.

Through the virtual actuator design of step 3, an input curve of an aero-engine system after fault is shown in FIG. 3, and a model output is shown in FIG. 4. Compared with the prior art, the input designed in step 3 can effectively reduce the bump brought by the switching and realize the recovery of a bumpless aero-engine system in FIG. 4.

step 6: respectively verifying the design of the bumpless transfer control under two conditions, wherein in a condition 2, a small perturbation model in a turbofan engine mode "FC01" of 90K is adopted, and the aero-engine system is:

$$A = \begin{bmatrix} -3.8557 & 1.4467 \\ 0.4690 & -4.7081 \end{bmatrix}, B = \begin{bmatrix} 230.6739 \\ 653.5547 \end{bmatrix}, \quad (27)$$

$$C = \begin{bmatrix} 1 & 0 \\ 0 & 1 \end{bmatrix}, x(0) = [-80, -103.5]^T$$

The control input is $u = W_f$, and $W_f$ is turbofan engine fuel flow, $y = [\Delta n_f(t), \Delta n_c(t)]^T$, where $\Delta n_f$ is the variation of the rotational speed of the fan of a turbofan engine, and $\Delta n_c$ is the variation of the rotational speed of a compressor of the turbofan engine.

Suppose the actuator fault occurs at $t=0.4$ s, $B_f$ is diagnosed at $t=0.8$ s.

$$B_f = \begin{bmatrix} 161.4717 \\ -522.8438 \end{bmatrix} \quad (28)$$

Figure 5:
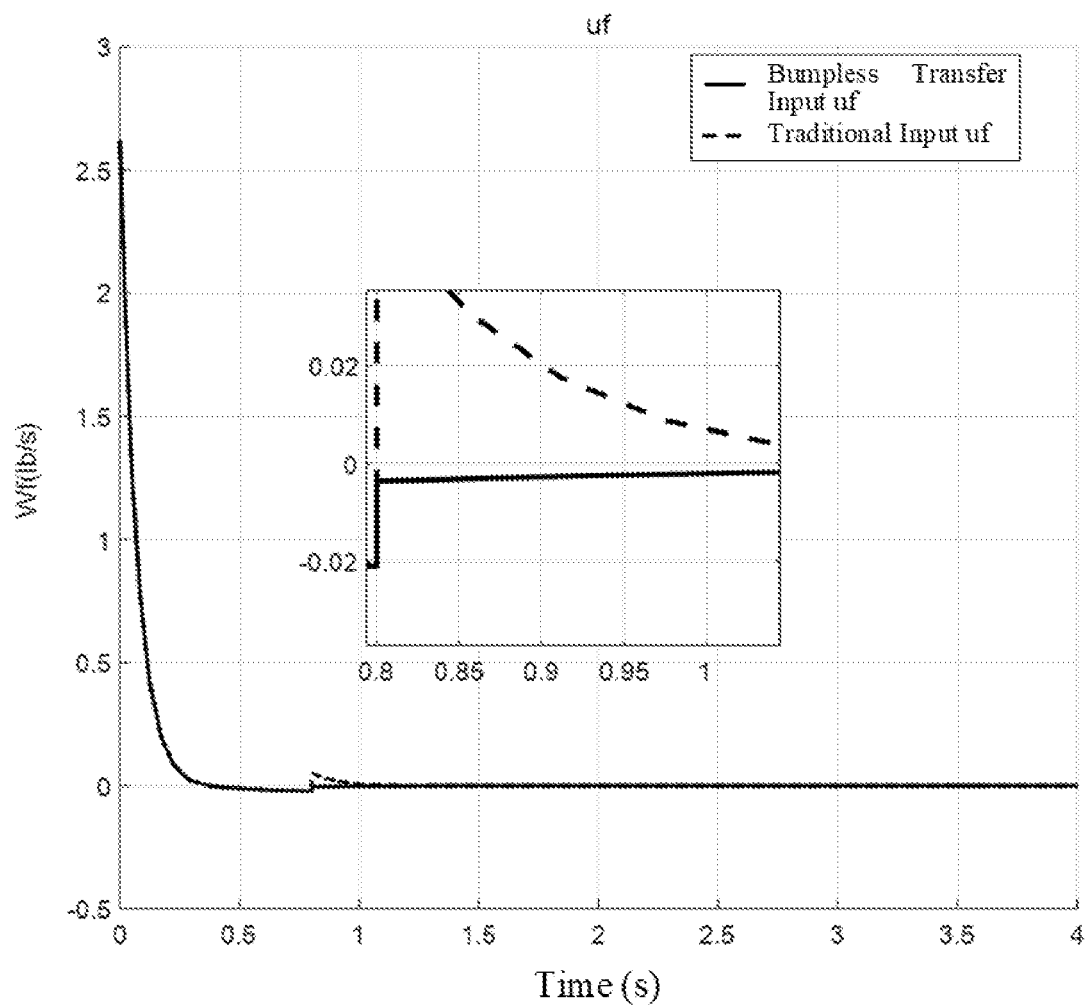
FIG. 5 is a contrast diagram of bumpless transfer of fuel flow $W_f$ of reconfiguration control input $[\Delta n_f(t), \Delta n_h(t)]^T$ in a condition 2.
Figure 6:
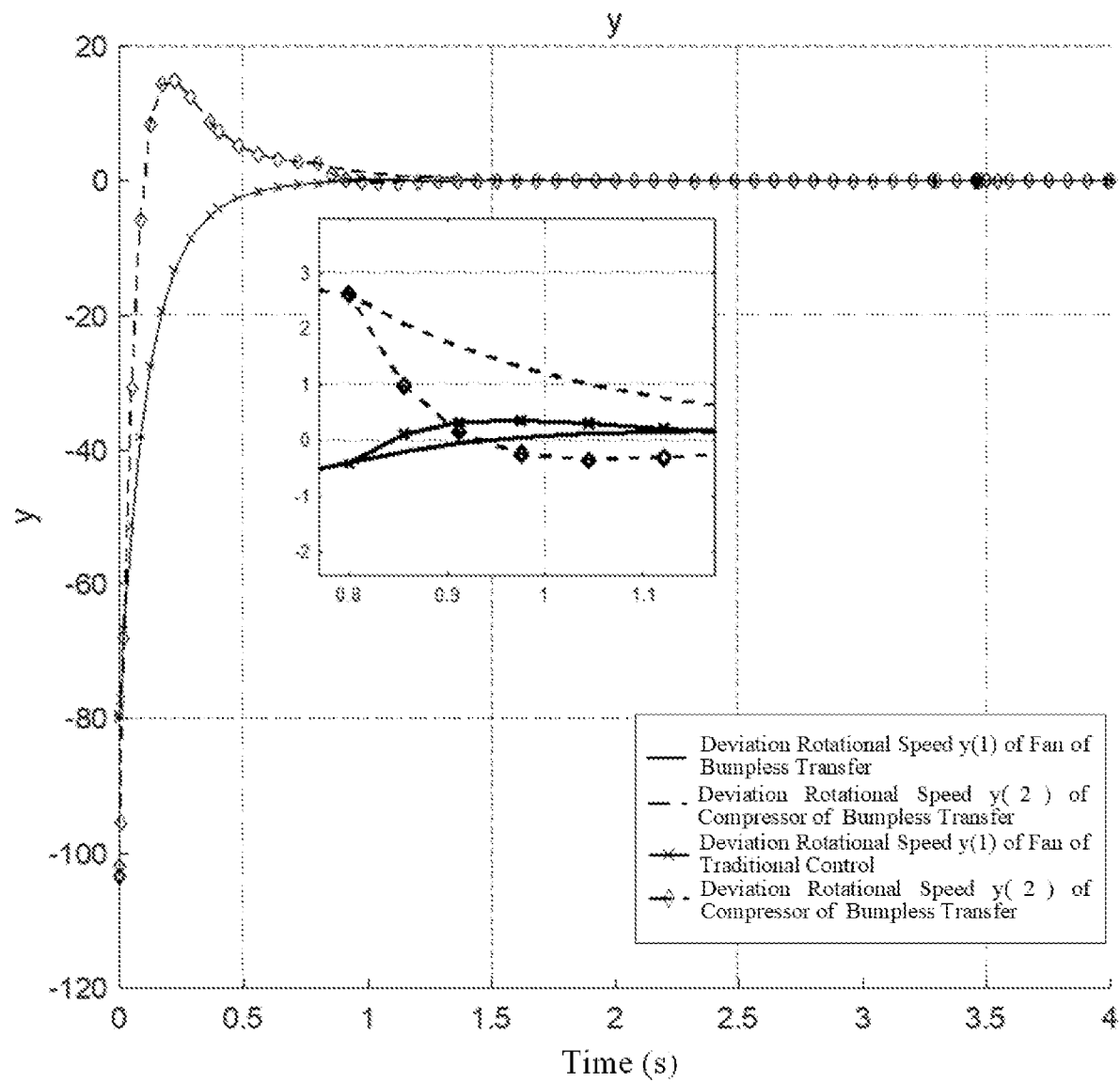
FIG. 6 is a contrast diagram of bumpless transfer of fuel flow $W_f$ of reconfiguration control output $[\Delta n_f(t), \Delta n_c(t)]^T$ in a condition 2.

Through the virtual actuator design of step 4, the input curve of a system after fault is shown in FIG. 5, and the model output is shown in FIG. 6. Compared with the prior art, the input designed in step 5 can effectively reduce the bump brought by the switching and realize the recovery of a bumpless aero-engine control system in FIG. 6.

The invention claimed is:

1. A bumpless transfer fault tolerant control method for an aero-engine actuator fault, wherein comprising the following steps:

step 1: expressing an aero-engine system as:

$$\begin{cases} \dot{x}(t) = Ax(t) + Bu(t) \\ y(t) = Cx(t) \end{cases} \quad (1)$$

where, $x(t) \in R^n$ is a state of a system, A is n-dimensional square matrix, B is n×m matrix, C is n-dimensional square matrix, $u(t) \in R^m$ is a system input and the input is designed as a form of output-state feedback: m is control input dimension, and n is state dimension;

$$u(t) = -Ky(t) \quad (2)$$

where, K is gain matrix of an aero-engine controller;
when the actuator fault occurs, the aero-engine system is expressed as $$\begin{cases} \dot{x}_f(t) = Ax_f(t) + B_f u_f(t) \\ y_f(t) = Cx_f(t) \end{cases} \quad (3)$$

where, an actuator fault matrix $B_f$ is known, and $B_f^T * B_f$ is an invertible matrix; and f is used for characterizing a subscript of a fault system;

step 2: designing an improved virtual actuator, with a structural form shown in (4):

$$\begin{cases} \dot{\tilde{x}}(t) = A\tilde{x}(t) + Bu(t) - B_f u_f(t) \\ u_f(t) = u_w(t) + Nu_c(t) \\ y_c(t) = C\tilde{x}(t) + y_f(t) \end{cases} \quad (4)$$

where, $\tilde{x}(t) \in R^n$ is a virtual actuator state, $u_c(t) = -Ky_c(t)$, K is the same as that in an equation (2), $u_w(t)$ is a parameter to be designed, $N = B_f^\dagger B_f$, $B_f^\dagger$ is a Moore-Penrose inverse matrix of $B_f$; c is a subscript of a nominal controller, and w is a subscript of a variable to be solved;

step 3: in order to implement an aero-engine fault system in step 1 of a bumpless transfer of an improved virtual actuator in step 2, designing parameter $u_w(t)$ shown in an equation (5), wherein when the parameter $u_w(t)$ is optimized, the bumpless transfer of the virtual actuator in step 2 is implemented;

$$J = \tfrac{1}{2}\tilde{x}^T(tf)C^T RC\tilde{x}(tf) + \int_0^{tf} \tfrac{1}{2}(Bu(t) - B_f u_f(t))^T P(Bu(t) - B_f u_f(t)) + \tfrac{1}{2}\tilde{x}^T(t)Q\tilde{x}dt \quad (5)$$

where, J is the performance function, $P \geq 0$, $Q \geq 0$, $R > 0$, $P+Q>0$, and P, Q, R are symmetric weight matrices;

step 4: according to a form of an actuator fault matrix $B_f$, considering the following two conditions:

Condition 1: $B_f B_f^\dagger B = B$ (6)

Condition 2: $B_f B_f^\dagger B \neq B$ (7)

when condition 1 occurs, the improved virtual actuator (4) in step 2 is simplified as a form of the following equation (8):

$$\begin{cases} \dot{\tilde{x}}(t) = A\tilde{x}(t) - B_f u_w(t) \\ \tilde{x}(t_0) = a \end{cases} \quad (8)$$

where, a is an initial state that constant vectors characterize, which is obtained through difference between a state in aero-engine system (1) in step 1 and a state in a system (3) at the time when $B_f$ is diagnosed after the fault;

when condition 2 occurs, the virtual actuator (4) in step 2 is written as a form of the following equation (9):

$$\begin{cases} \dot{\tilde{x}}(t) = A\tilde{x}(t) - (I - B_f B_f^\dagger)BKC\tilde{x}(t) - (I - B_f B_f^\dagger)BKy_f(t) - B_f u_w(t) \\ \tilde{x}(t_0) = a \end{cases} \quad (9)$$

where, a is an initial state that constant vectors characterize, which is obtained through difference between the state in aero-engine system (1) in step 1 and the state in a system (3) at the time when the fault $B_f$ is diagnosed, and I is n-dimensional square matrix;

step 5: in consideration of the condition 1 in step 4, designing a parameter $u_w(t)$ according to an equation (10), that is, satisfying the parameter $u_w(t)$ in step 3 and implementing an aero-engine fault system (3) in step 1 of the bumpless transfer of the improved virtual actuator (4) in step 2:

$$u_w(t) = (B_f^T(P+Q)B_f)^{-1}B_f^T(QA+F(t))\tilde{x}(t) \quad (10)$$

where, the matrix F (t) is a symmetric positive definite matrix, and satisfies the equation (11) in the time interval $t \in [0, tf]$:

$$-\dot{F}(t) = F(t)A + (A^T - (A^T Q + F(t))B_f(B_f^T(P+Q)B_f)^\dagger B_f^T)(QA + F(t))) \quad (11)$$

F(t) satisfies the following boundary condition (12):

$$C^T F(tf) C = R \quad (12)$$

where, R is a weight matrix in step 3(5);

step 6: in consideration of the condition 2 in step 4, defining $\hat{x}(t) := \tilde{x}(t) + x_f(t)$, and expressing a reconfigured aero-engine control system as:

$$\begin{cases} \dot{\hat{x}}(t) = A\hat{x}(t) + Bu(t) \\ \hat{y}(t) = C\hat{x}(t) \end{cases} \quad (13)$$

wherein, the initial state is $\hat{x}(0) = x_f(0) + \tilde{x}(0)$; and the reconfigured aero-engine control system state (14) influenced only by a design parameter K of an original aero-engine system controller is obtained by substituting an output-state feedback controller $u(t) = -K\hat{y}(t) = -KC\hat{x}(t)$ into an equation (13), where K is consistent with the designed K in the equation (2) of step 1:

$$\dot{\hat{x}}(t) = (A - BKC)\hat{x}(t) \tag{14}$$

the equation (14) is substituted into a virtual actuator structure (9) in step 4, to obtain:

$$\begin{cases} \dot{\tilde{x}}(t) = A\tilde{x}(t) - B_f u_w(t) - (I - B_f B_f^\dagger)BKC\hat{x}(t) \\ \tilde{x}(t_0) = a \end{cases} \tag{15}$$

the parameter $u_w(t)$ is shown in an equation (16), that is, the performance index function in step 3 is satisfied, and the aero-engine fault system (3) in step 1 of the bumpless transfer of the improved virtual actuator (4) in step 2 is implemented:

$$u_w(t) = (B_f^T(P+Q)B_f)^{-1}B_f^T(-(P+Q)(I-B_fB_f^\dagger)BKC\hat{x}(t) + (QA+E(t))\tilde{x}(t)+G(t)) \tag{16}$$

where, $\hat{x}(t)$ satisfies the equation (14), and $E(t)$ is the symmetric positive definite matrix of the equation (17) and satisfies a boundary condition of the equation (18);

$$-\dot{E}(t) = E(t)\big(I - B_f(B_f^T(P+Q)B_f)^{-1}B_f^T Q\big)A + \tag{17}$$

-continued
$$A^T\big(I - QB_f(B_f^T(P+Q)B_f)^{-1}B_f^T\big)E(t) -$$
$$E(t)B_f(B_f^T(P+Q)B_f)^{-1}B_f^T E(t) +$$
$$A^T QA - A^T QB_f(B_f^T(P+Q)B_f)^{-1}B_f^T QA$$

$E(t)$ satisfies the boundary condition:

$$C^T E(tf)C = R \tag{18}$$

an adjoint vector $G(t)$ satisfies the following equation:

$$\dot{G}(t) = \big((A^T Q + E(t))B_f(B_f^T(P+Q)B_f)^{-1} - A^T\big)G(t) + (E(t) + A^T Q) \tag{19}$$
$$\big(I - B_f(B_f^T(P+Q)B_f)^{-1}(P+Q)\big)\big(I - B_f B_f^\dagger\big)KC\hat{x}(t)$$

the boundary condition of the adjoint equation (19) is $$G(tf) = 0 \tag{20};$$

and step 7: controlling the aero-engine system using one of the improved virtual executor of equations (8) or (9) when the aero-engine actuator is faulty.

\* \* \* \* \*